United States Patent [19]

Boydston

[11] Patent Number: 4,600,233
[45] Date of Patent: Jul. 15, 1986

[54] MINI-TONNEAU COVER APPARATUS FOR REAR COMPARTMENT OF CONVERTIBLE VEHICLE

[76] Inventor: Robert W. Boydston, 156 Lynx Dr., Sedona, Ariz. 86336

[21] Appl. No.: 693,617

[22] Filed: Jan. 22, 1985

[51] Int. Cl.$^4$ .............................................. B60R 7/04
[52] U.S. Cl. ........................... 296/24 R; 296/37.16; 296/136; 150/52 K; 224/42.42
[58] Field of Search .................. 296/37.1, 37.5, 37.8, 296/37.16, 76, 136, 24 R; 150/52 K, 52 R (U.S. only); 224/42.42

[56] References Cited

U.S. PATENT DOCUMENTS

| | | | |
|---|---|---|---|
| 1,950,927 | 3/1934 | McMillan | 296/1 R |
| 2,711,769 | 6/1955 | Katcher et al. | 150/52 R |
| 3,891,252 | 6/1975 | Lehmann | 296/136 |
| 3,909,060 | 9/1975 | Katayama | 296/76 |
| 4,118,066 | 10/1978 | Ricke | 296/136 |
| 4,220,367 | 9/1980 | Gale et al. | 296/37.16 |
| 4,355,839 | 10/1982 | Rosen | 296/136 |
| 4,480,675 | 11/1984 | Berkemeier | 296/37.16 |
| 4,502,674 | 3/1985 | White et al. | 296/37.16 |

FOREIGN PATENT DOCUMENTS 2036146  6/1980  United Kingdom ............ 296/37.16

Primary Examiner—Robert B. Reeves
Assistant Examiner—Dennis H. Pedder
Attorney, Agent, or Firm—H. Gordon Shields

[57] ABSTRACT

Mini-tonneau cover apparatus for a rear compartment of a convertible vehicle includes an upper, outer periphery having a bead for securing an upper, outer portion of the flexible tonneau cover to the vehicle and a rod extending laterally across the rear compartment over which the flexible tonneau cover is disposed. A lower, front portion of the flexible tonneau cover is secured by appropriate fasteners, such as "Velcro" type fasteners, to hold the bottom of the flexible tonneau cover in place.

9 Claims, 7 Drawing Figures

U.S. Patent  Jul. 15, 1986  4,600,233
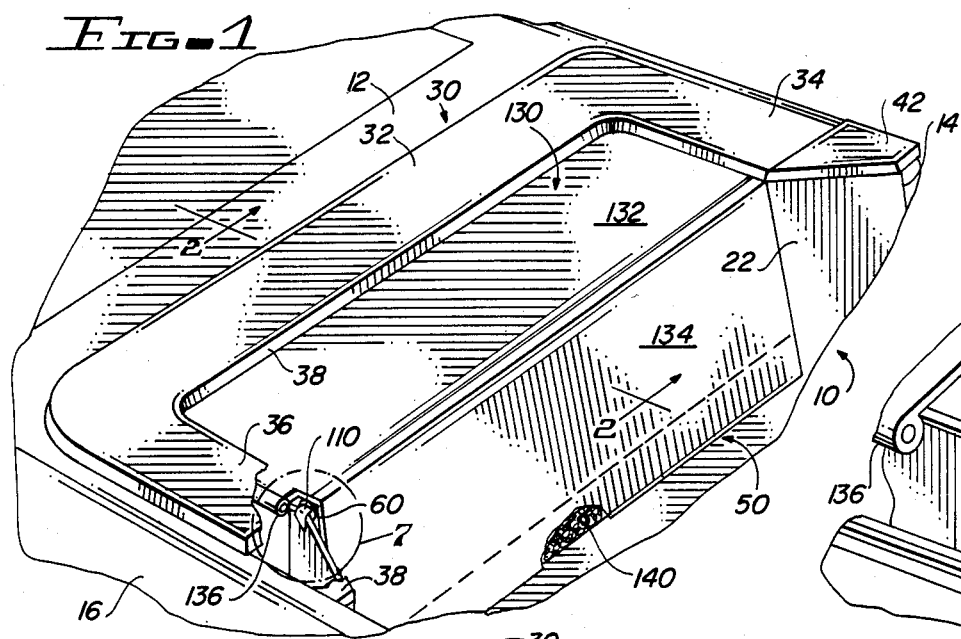
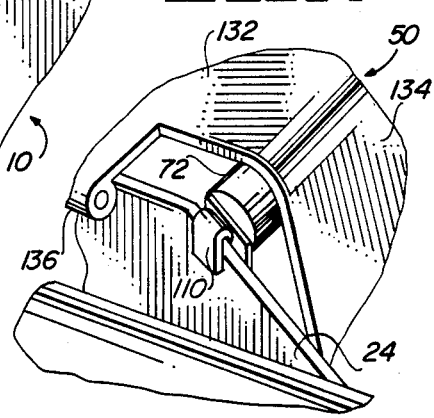
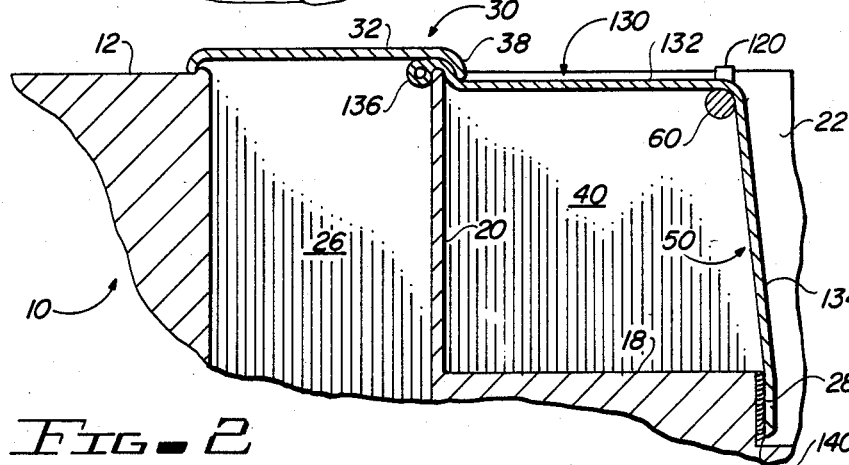
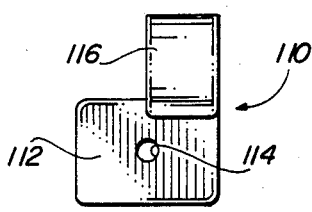
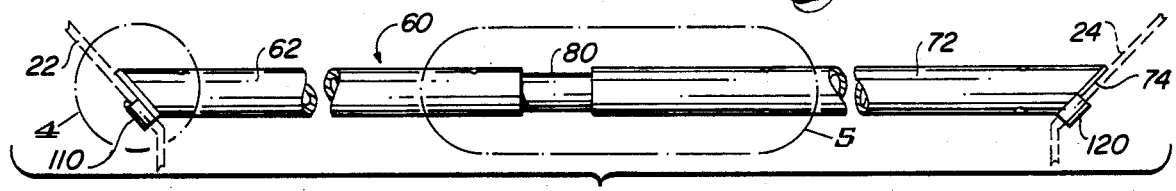
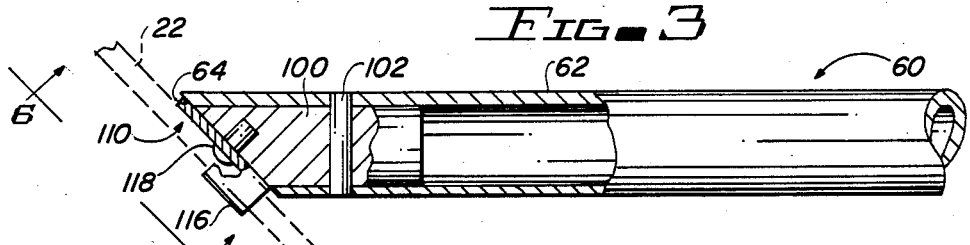
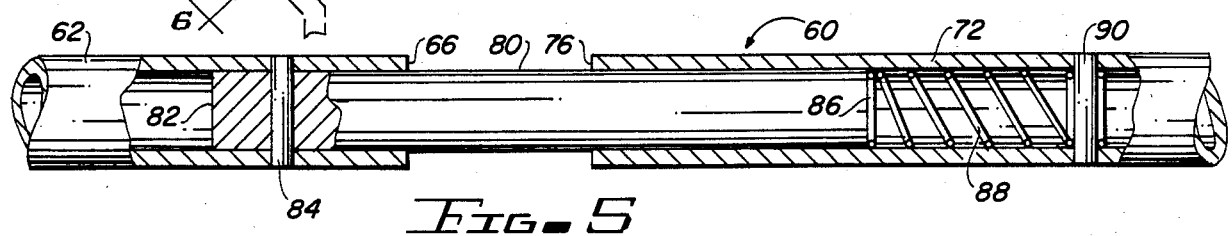

MINI-TONNEAU COVER APPARATUS FOR REAR COMPARTMENT OF CONVERTIBLE VEHICLE

BACKGROUND OF THE INVENTION

1. Field of the Invention

This invention relates to mini-tonneau cover apparatus, and, more particularly, to a mini-tonneau cover for a rear compartment of a convertible automobile for use when the convertible top is up and also for use when the top is down.

2. Description of the Prior Art

U.S. Pat. No. 1,073,398 discloses a cover for an automobile rear portion in which the cover is primarily designed to cover a collapsible top that is folded over the rear portion of the vehicle, and is also designed to cover part of the back seat. The apparatus includes the combination of straps and snaps to secure the cover in place.

U.S. Pat. No. 1,186,883 discloses another type of cover for the rear part of an automobile. The cover also includes a portion, like the '398 patent, which extends over a collapsed top. However, unlike the '398 patent, the apparatus of the '883 patent extends forwardly to cover the rear portion of the front seat. The cover apparatus is secured in place primarily by straps and also by grommet reinforced buttonholes, with the buttons secured to the vehicle and the buttonholes disposed in the cover.

U.S. Pat. No. 1,728,006 discloses a top for a rumble seat. The top includes a frame over which a flexible cover extends. Snaps are used to secure the cover at the rear of the rumble seat.

U.S. Pat. No. 1,950,927 discloses another type of flexible cover for the rear seat of an open automobile. The cover is secured to a roller at its lower front part, and extends over another roller and secures rearwardly of the back seat. The cover in the '927 patent is not a flexible fabric or leather, etc., as in the above-discussed patent. Rather, the cover is a segmented cover flexible only in one direction. The segments extend laterally from side to side with respect to the automobile, and accordingly are laterally rigid, but are flexible from front to rear.

U.S. Pat. No. 2,638,378 discloses a tonneau cover for a relatively small sports car. The cover snaps in place to cover the back of the vehicle plus the sides of the vehicle, including the driver and passenger seats. A longitudinally extending zipper allows the driver's seat to be uncovered while the vehicle is being driven, and allows the cover to remain in place on the rest of the vehicle.

U.S. Pat. No. 3,154,341 discloses a pair of rigid tonneau covers which extend between the upper portion of the front seat back and rearwardly to cover the rear seat. The apparatus is secured in place by brackets and movable metal loops which together form well-known locking elements.

U.S. Pat. No. 3,492,043 discloses a removable and flexible rear seat covering. The flexible covering extends horizontally from the back or rear portion of the vehicle generally forwardly to the rear of the back seat, then upwardly for securing to a raised portion of the vehicle frame.

U.S. Pat. No. 4,118,066 discloses covering apparatus designed for the seats of automotive vehicles. In different embodiments, the apparatus may be used for either a front seat alone or for both front and rear seats. The covering apparatus rolls on and off a roller, like a window shade, and then the free end may be secured by appropriate fasteners, such as "Velcro" type fasteners.

British (UK) Pat. No. 2,049,571 discloses another type of flexible tonneau for covering the front seat of a vehicle. The apparatus is comparable to the covering apparatus disclosed in U.S. Pat. No. 2,638,378, discussed above, in that it snaps in place and includes a center openable portion so that the driver's seat may be used, while the passenger seat remains covered. The apparatus also includes an elevated ridge which raises the center portion of the apparatus so that rain water drains away from the seat toward the outer, peripheral edges of the apparatus, and thus away from the driver and passenger seats. The longitudinally extending zipper which divides the passenger covering portion from the driver covering portion may be covered for additional protection from rain water flowing or dripping into the interior of the vehicle beneath the cover.

SUMMARY OF THE INVENTION

The invention described and claimed herein comprises a flexible cover for the rear compartment of a convertible vehicle which may be easily installed and easily removed, as desired, and it includes a bead portion held in place by an integral lid for the convertible top storage cavity, and a transversely extending rod over which the flexible cover extends. The front portion of the cover apparatus is secured to the lower part of the compartment by appropriate fasteners, such as "Velcro" type fasteners. The rod, which extends transversely between the sides of the vehicle and across the compartment being covered, includes hook elements which are secured to the sides of the compartment and are easily installed on and which are secured to the sides of the compartment and are easily installed on and removed from the compartment sides.

Among the objects of the present invention are the following:

To provide new and useful tonneau cover apparatus for a rear compartment of an automotive vehicle;

To provide new and useful tonneau cover apparatus having a flexible covering for an automotive compartment;

To provide new and useful tonneau cover apparatus including a rod which extends transversely across a compartment to be covered;

To provide new and useful cover apparatus for a compartment;

To provide new and useful covering which may easily be installed over and removed from the compartment;

To provide new and useful cover apparatus including a bead portion which is secured to the rear of the compartment by an integral lid or cover; and To provide new and useful tonneau cover apparatus including a flexible covering portion and a rod to support the flexible covering portion between opposite ends of the flexible covering which are secured in place at the upper rear and lower front, respectively, of an automotive storage compartment.

BRIEF DESCRIPTION OF THE DRAWING

FIG. 1 is a perspective view of the apparatus of the present invention showed installed in its use environment in an automotive vehicle.

FIG. 2 is a view in partial section taken generally along line 2—2 of FIG. 1.

FIG. 3 is a front view of a portion of the apparatus of the present invention.

FIG. 4 is an enlarged view in partial section taken generally from circle 4 of FIG. 3.

FIG. 5 is an enlarged view in partial section taken generally from oval 5 of FIG. 3.

FIG. 6 is a view of a portion of the apparatus of the present invention taken generally along line 6—6 of FIG. 4.

FIG. 7 is an enlarged perspective view of a portion of the apparatus of the present invention taken generally from circle 7 of FIG. 1.

DESCRIPTION OF THE PREFERRED EMBODIMENT

FIG. 1 is a perspective view of cover apparatus 50 of the present invention shown in its use environment covering a rear parcel shelf and package storage compartment 40 behind the seat of a single seat convertible automobile 10. The automobile 10 includes a rear deck 12 with a pair of sides, including a side 14 and a side 16. The automobile 10 also includes a lid or cover 30 which covers a compartment 26 in which the folded convertible top for the automobile 10 is stored. The cover apparatus 50 includes a rod 60 which extends between opposite sides of the automobile 10, and a flexible cover 130 which extends over the rod 60 and is held in place in part by the lid 30.

FIG. 2 is a view in partial section taken generally along line 2—2 of FIG. 1, showing the cover apparatus 50 extending over the rod 60 and held in place in part by the lid 30.

FIG. 3 is a top view of the rod 60. FIG. 4 is an enlarged view in partial section of a portion of the rod 60, taken generally from circle 4 of FIG. 3. FIG. 5 is an enlarged view in partial section of another portion of the rod 60, taken generally from oval 5 of FIG. 3. FIG. 6 is a front view of a hanger element used with the apparatus of the present invention, and taken generally along line 6—6 of FIG. 4.

FIG. 7 is an enlarged perspective view of a portion of the apparatus of the present invention, taken generally from circle 7 of FIG. 1. For the following discussion concerning the apparatus of the present invention, reference will be made to FIGS. 1-7.

The cover or lid 30 is molded into a single piece, and is a "hard" cover designed to be the top closure for the convertible top storage compartment 26. In FIG. 2, the convertible top storage compartment 26 is shown empty for convenience.

The lid 30 includes three primary portions, a back portion 32, and two side portions 34 and 36. The side portions 34 and 36 are disposed at opposite ends of the back portion 32. For purposes of the present invention, another important portion of the lid 30 is an inside edge 38. The inside edge 38 extends on the inner periphery of the side 34, the back 32, and the side 36. The inside edge 38 is adapted to be disposed over a wall 20 which separates the convertible top compartment 26 from the package storage compartment 40 which the apparatus 50 is designed to cover or to enclose. The package storage compartment 40 includes a bottom parcel shelf 18, the wall 20, and a pair of side walls 22 and 24.

At the outer ends of the side portions 34 and 36 are a pair of triangular shaped plates covering the forward portions of the compartment 26. A plate 42 is shown at the end of the side portion 34 in FIG. 1. The other plate has been omitted for illustrative purposes.

The side walls 22 and 24 are the side walls for the rear portion of the automobile 10, and are disposed inwardly from the automobile sides 14 and 16, respectively. In the automobile 10 in which the apparatus 50 is disposed, the compartment 40, including the parcel shelf 18 and the area above the shelf and forwardly of the wall 20, is not sufficiently large to include a rear seat. Accordingly, the shelf 18 is simply designated as a parcel shelf, and the area rearwardly of the seats (not shown) and above the shelf 18 and forwardly of the wall 20 merely defines an enclosure or package compartment 40 in which miscellaneous packages, etc., may be disposed. For convenience and for security reasons, it is desirable to cover that particular area or compartment 40, and for such purposes the apparatus 50 is designed.

The rod 60 preferably includes three portions, including an outer tube 62, an outer tube 72, and a center element 80. The center element 80 is telescoped within the tubular members 62 and 72.

The outer ends of the tubular members 62 and 72 are slanted to conform to the side walls 22 and 24. The tube 62 includes a slanted end 64, and the tube 72 includes the slanted end 74. The inner ends of the tubular members 62 and 72 are straight. That is, the ends are substantially perpendicular to the longitudinal axis of the tubes. The tube 62 includes a straight end 66, and the tube 72 includes a straight end 76. The members 62 and 72 are preferably substantially identical to each other in diameter, and in length.

The center member 80 extends into the tubes 62 and 72 and inwardly from the straight ends 66 and 76, respectively. The center member 80 is preferably a solid cylindrical member, the outer diameter of which is substantially the same as the inner diameter of the tubular members 62 and 72.

The center member 80 includes an end 82 and an end 86. The ends 82 and 86 are disposed within the tubular members 62 and 72, respectively. The member 80 is secured to the member 62 by a pin 84. The pin 84 is shown in FIG. 5 as extending diametrically through both the tubular member 62 and the center member 80 and adjacent to the end 82.

A pin 90 extends diametrically through the tubular member 72 a reasonable distance from the end 76. A compression spring 88 is disposed between the pin 90 and the end 76. The pin 90 extends through one of the coils of the spring 88 so that the spring 88 is permanently disposed within the member 72. The end 86 of the center member 80 extends into the tubular member 72 and is disposed against the free end of the compression spring 88. The compression spring 88 urges the center member outwardly relative to the tubular member 72. Since the center member 80 is pinned to the tubular member 62, the compression spring 88 also urges the tubular member 62 outwardly or away from the tubular member 72, and when sufficient inward bias is placed on the tubular members 62 and 72, the compression spring 88 is compressed to allow the overall length of the rod 60 to be decreased.

Rod 60 is held in position by a pair of hanger elements 110 and 120. The hanger elements 110 and 120 are disposed at the ends 64 and 74, respectively, of the tubular elements 62 and 72, respectively. The hangers 110 and 120 are secured to the tubular members 62 and 72 by means of rivets fixed to the hangers and extending into plugs in the outer ends of the tubular members.

The hanger element 110 includes a base plate 112 with an aperture 114 extending through the base plate 112. Extending upwardly from the base plate 112 is a hook or a U-bend portion 116. A rivet 118 is shown in FIG. 4 as extending through the aperture 114. The rivet 118 is thus secured to the hanger 110. In turn, the rivet shank extends into a plug 100 which is disposed within the outer end of the tubular member 62. The hanger 120 is similarly secured to a rivet, and the rivet shank similarly extends into a plug secured to the outer end of the tubular member 72.

The plug 100 is shown secured to the outer end of the tubular member 62 by a pin 102. The pin 102 extends diametrically through the tubular member 62 and the plug 100. If desired, of course, the plug 100 may be appropriately cemented into the end of the tubular member 62 instead of using the pin 102. The outer end of the plug 100 is flush with the slanted or angled end 64 of the tube 62. The slanted or angled end 74 of the tubular member 72 receives a plug substantially identical to the plug 100.

The hanger 120 is substantially identical to the hanger 110, except that it is a mirror image thereof.

The purpose of the angled or slanted ends 64 and 74 of the rod 60 is to conform to the angular orientation of the side walls 22 and 24. This is best shown in FIGS. 1 and 7. The angular orientation of the walls 22 and 24 requires that the outer ends of the rod 60 be similarly angled so that the rod 60 will be disposed snugly and securely against the walls. The hangers 110 and 120 extend over the upper or top portions of the walls 22 and 24, respectively. As the spring 88 urges the tubular portions 62 and 72 of the rod outwardly, the angled ends and the hangers secured thereto are urged against the side walls 22 and 24.

The cover 130 includes two portions, a top panel portion 132 and a lower panel portion 134. The rod 60 divides the cover 130 into the two panel portions 132 and 134.

Extending about the periphery of the top panel portion 132 of the cover 130 is a bead 136. The bead 136 is simply a circular portion designed to provide a substantial thickness for the cover so that when the lid 30 is in place, the bead 136 is disposed over or rearwardly of the rear wall 20 and the side walls 22 and 24, and thus in the top or upper portion of the convertible top storage compartment 26. This is best shown in FIG. 2. When the lid 30 is placed over the convertible top storage compartment 26, the inside edge 38 of the lid 30 will be on top of the portion of the top panel 132 adjacent to the bead 136, and the bead 136 will accordingly be locked within the compartment 26, and thus remote from the package compartment 40, and held therein by the lid 30. Again, this is best shown in FIG. 2.

If desired, or if necessary, a rope of some type may be placed within the bead 136 to insure the integrity of the upper portion of the top panel 132 to insure that it remains in place. Typically, the lid 30 latches into place, and accordingly applies sufficient pressure against the upper panel 132 of the cover 130 to hold the upper portion of the top panel 132 securely against the three wall portions 20, 22, and 24 by locking the bead 136 within the convertible top storage compartment 26.

The lower panel portion 134 of the cover 130 extends downwardly to the bottom of the package storage compartment 40, adjacent to the parcel shelf 18. It is held in place on the bottom wall portion 28 by appropriate fasteners, such as "Velcro" type fasteners 140. As is well known and understood, the "Velcro" type fasteners include two portions, a hook portion and a loop portion. The hook and loop portions are intertwined when the two portions are pressed together. Typically, the loop portion of the "Velcro" type fastener is secured to the bottom wall 28, and the hook portion is secured to the inside bottom portion of the lower panel 134.

After the cover 130 is in place, beginning with the placing of the bead 136 over the walls 20, 22, and 24, the lid 30 is then closed over the convertible top storage compartment 26. When closed, the lid is over the wall portions 20, 22, and 24, and the inside edge or lip 38 is disposed on the top panel 132 and against the back wall 20 and the side walls 22 and 24 to lock the bead 136 in the compartment 26. The lower panel 34 is disposed over the rod 60 and the bottom portion of the panel 34 is pressed against the bottom wall 28 to secure the bottom of the lower panel 134 in place. The lower portion of the panel 34 is, of course, "pressed" against the bottom wall 28 in the area or areas where the fasteners are located.

The number of mating "Velcro" type fastener elements secured to the lower portion or to the bottom portion of the lower panel 134 defines the extent to which the bottom portion of the lower panel 134 is secured against the bottom wall 28. With several separate and spaced apart fastener elements secured to the bottom portion of the lower panel 134, the lower panel 134 is more secure with respect to the bottom wall 28.

For convenience, the color of the cover 130 may be appropriately matched to the color of the lid 30. It will be noted that the cover 130 is independent of the seats, and the seats may be appropriately moved forwardly, rearwardly, up and down, or folded, as desired, and as necessary.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Cover apparatus for covering a package compartment having a rear wall and side walls and a bottom wall in an automobile, comprising, in combination:
   lid means disposed substantially rearwardly of the rear wall;
   rod means removably secured to the side walls of the compartment;
   cover means disposed over the rod means and dividing the cover means into
      a first portion having a bead, said bead disposed over the rear wall and the side walls and the first portion extends from the rod means to the side walls and to the rear wall and is secured by engagement of the lid means and bead to the side walls and to the rear wall, and
      a second portion extending from the rod means and downwardly between the side walls to the bottom wall; and means for securing the second portion of the cover means to the bottom wall.

2. The apparatus of claim 1 in which the rod means includes hanger means for supporting the rod means on the side walls of the package compartment.

3. The apparatus of claim 2 in which the side walls have an angular orientation and the rod means further includes angled ends to conform to the angular orientation of the side walls.

4. The apparatus of claim 3 in which the hanger means includes a first hanger for supporting one angled end of the rod means and a second hanger for supporting the other angled end of the rod means.

5. The apparatus of claim 4 in which the rod means includes a first rod member and a second rod member movable relative to the first rod member.

6. The apparatus of claim 4 in which the first and second rod members are telescoping members for varying the length of the rod means.

7. The apparatus of claim 6 in which the rod means further includes a compression spring for urging the first and second rod members outwardly with respect to each other to urge the angled ends of the rod members and the hanger means against the walls of the package compartment.

8. The apparatus of claim 7 in which the means for securing the second portion of the cover means to the bottom wall includes a first fastening portion secured to the bottom wall and a second fastening portion secured to the second portion of the cover.

9. The apparatus of claim 8 in which the lid locks the bead remote from the package compartment.

* * * * *